United States Patent [19]

Müller

[11] Patent Number: 5,939,489
[45] Date of Patent: Aug. 17, 1999

[54] CROSSLINKED POLYMERS CONTAINING SALT STRUCTURES

[75] Inventor: Beat Müller, Marly, Switzerland

[73] Assignee: Novartis AG, Basel, Switzerland

[21] Appl. No.: 08/875,530

[22] PCT Filed: Jan. 23, 1996

[86] PCT No.: PCT/EP96/00254

§ 371 Date: Sep. 12, 1997

§ 102(e) Date: Sep. 12, 1997

[87] PCT Pub. No.: WO96/24078

PCT Pub. Date: Aug. 8, 1996

[30] Foreign Application Priority Data

Feb. 3, 1995 [CH] Switzerland ................ 314/95

[51] Int. Cl.⁶ ........................................... C08F 8/00
[52] U.S. Cl. ................................. 525/61; 523/106
[58] Field of Search ................... 523/106, 107, 523/108; 525/61

[56] References Cited

U.S. PATENT DOCUMENTS

| | | | |
|---|---|---|---|
| 4,018,853 | 4/1977 | LeBoeuf | 525/283 |
| 4,088,500 | 5/1978 | Fairbanks | 523/120 |
| 4,095,877 | 6/1978 | Stoy | 523/106 |
| 4,228,056 | 10/1980 | Stoy | 523/113 |
| 4,347,198 | 8/1982 | Ohkada et al. | 264/2.3 |
| 4,670,506 | 6/1987 | Goldenberg et al. | 525/59 |
| 5,002,978 | 3/1991 | Goldenberg | 523/106 |
| 5,373,059 | 12/1994 | Asanuma | 524/547 |
| 5,508,317 | 4/1996 | Müller | 522/85 |

FOREIGN PATENT DOCUMENTS

| | | |
|---|---|---|
| 0201693A2 | 3/1986 | European Pat. Off. . |
| 0321403A2 | 12/1988 | European Pat. Off. . |
| 0201693A3 | 11/1990 | European Pat. Off. . |
| 0486715A1 | 11/1990 | European Pat. Off. . |
| 0534307A2 | 6/1992 | European Pat. Off. . |
| 0641806A2 | 7/1994 | European Pat. Off. . |

OTHER PUBLICATIONS

Chemical Abstracts. vol. 99:176861q(1983).

*Primary Examiner*—Paul R. Michl
*Attorney, Agent, or Firm*—Michael U. Lee

[57] ABSTRACT

The invention relates to a process for the production of moldings, in particular contact lenses, in which a water-soluble crosslinkable polymer is crosslinked in solution, and to moldings, in particular contact lenses, obtainable by this process. The present invention likewise relates to novel crosslinkable polymers comprising units containing a crosslinkable group, units containing an acidic group and/or units containing a basic group which can be employed in the novel process, in particular derivatives of a polyvinyl alcohol having a molecular weight of at least about 2000, and to crosslinked polymers, either homopolymers or copolymers, made from these novel crosslinkable polymers, a process for the preparation of the novel crosslinkable polymers and the homopolymers and copolymers obtainable therefrom, to moldings made from said homopolymers or copolymers, in particular contact lenses made from these homopolymers or copolymers, and to a process for the production of contact lenses using said homopolymers or copolymers.

11 Claims, No Drawings

CROSSLINKED POLYMERS CONTAINING SALT STRUCTURES

The invention relates to a novel process for the production of mouldings, in particular contact lenses, in which a crosslinkable polymer or a crosslinkable polymer mixture commprising crosslinkable groups, acidic groups and/or basic groups is crosslinked in solution, and to mouldings, in particular contact lenses, which are obtainable by this process.

The present invention also relates to novel crosslinkable polymers which can be employed in the crosslinking process, in particular those based on starting polymers containing functional groups, for example hydroxyl groups, on the polymer chain or functional groups, for example imino groups, in the polymer chain or functional groups bonded to the polymer skeleton via a bridge, where these functional groups allow covalent bonds to compounds containing a crosslinkable modifier group or another modifier group. These starting polymers are, in particular, polyhydroxyl compounds having a 1,2- and/or 1,3-diol structure, such as polyvinyl alcohol, or hydrolysed copolymers of vinyl acetate, for example copolymers with vinyl chloride, N-vinylpyrrolidone, etc. These are, in particular, crosslinkable polymers comprising units containing a crosslinkable group in addition to units containing an acidic group, crosslinkable polymers comprising units containing a crosslinkable group in addition to units containing a basic group, and novel crosslinkable polymers comprising units containing a crosslinkable group in addition to units containing an acidic group and units containing a basic group, and furthermore crosslinked polymers, either homopolymers or copolymers, made from these novel crosslinkable polymers, a process for the preparation of the novel crosslinkable polymers and the homopolymers and copolymers obtainable therefrom, mouldings made from said homopolymers or copolymers, in particular contact lenses made from these homopolymers or copolymers, and a process for the production of contact lenses using the said homopolymers or copolymers.

The novel crosslinkable polymers must, as mentioned, comprise units containing crosslinkable groups. The term crosslinkable groups is taken to mean conventional crosslinkable groups which are well-known to the person skilled in the art, for example photocrosslinkable or thermally crosslinkable groups. Particularly suitable crosslinkable groups are those as have already been proposed for the preparation of contact-lens materials. These include, not exclusively, in particular groups containing a carbon-carbon double bond. However, in order to demonstrate the variety of crosslinkable groups which are suitable, crosslinking mechanisms which may be mentioned here merely by way of example, are free-radical polymerization, 2+2 cycloaddition, Diels-Alder reaction, ROMP (ring opening metathesis polymerization), vulcanization, cationic crosslinking and epoxy curing.

In addition to the units containing a crosslinkable group, the novel crosslinkable polymers must also comprise a group which has an acid functionality or additionally must comprise a group which has a basic functionality.

However, it is also possible for the crosslinkable polymer to comprise all three units, so that all three groups are present, namely a crosslinkable group, an acidic group and a basic group. In this case, the polymers are intramolecular salts.

Preference is given to crosslinkable polymers comprising units containing a crosslinkable group and an acidic group and units containing a crosslinkable group and a basic group. In this case, a mixture of these two crosslinkable polymers is preferably crosslinked.

The present invention relates, in particular, to crosslinkable polymers in which the linking of these units to the starting polymer backbone takes place covalently, so that these groups are bonded irreversibly.

Suitable starting polymers here are all polymers based on polyhydroxyl compounds, in particular those having a 1,3-diol backbone, especially polyvinyl alcohol.

In a polyvinyl alcohol of this type, a certain percentage of the 1,3-diol units has, in accordance with the invention, been modified to give a 1,3-dioxane containing, in the 2-position, a crosslinkable radical or a radical containing an acidic group or a basic group. These radicals are, in particular, aminoalkyl radicals with either a crosslinkable group or an acidic group bonded to the nitrogen atom. The present invention likewise relates to crosslinked homopolymers or copolymers of said crosslinkable polymers, to a process for the preparation of the novel crosslinkable polymers and the homopolymers and copolymers obtainable therefrom, to mouldings made from such homopolymers or copolymers, in particular contact lenses made from these homopolymers or copolymers, and to a process for the production of contact lenses using said homopolymers or copolymers.

The novel crosslinkable polymer is preferably a derivative of a polyvinyl alcohol having a mean molecular weight of at least about 2000 which comprises, as units containing a crosslinkable group, in particular units of the formula I

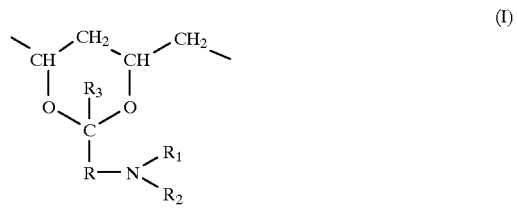

in which R is alkylene having up to 12 carbon atoms, $R_1$ is hydrogen or lower alkyl, and $R_2$ is an olefinically unsaturated, electron-withdrawing, copolymerizable radical, preferably having up to 25 carbon atoms, and $R_3$ is hydrogen, a $C_1$–$C_6$alkyl group or a cycloalkyl group.

$R_2$ is, for example, an olefinically unsaturated acyl radical of the formula $R_4$—CO—, in which $R_4$ is an olefinically unsaturated, crosslinkable radical having 2 to 24 carbon atoms, preferably having 2 to 8 carbon atoms, particularly preferably having 2 to 4 carbon atoms. In another embodiment, the radical $R_2$ is a radical of the formula II

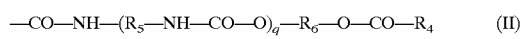

in which q is zero or one, and $R_5$ and $R_6$, independently of one another, are lower alkylene having 2 to 8 carbon atoms, arylene having 6 to 12 carbon atoms, a saturated bivalent cycloaliphatic group having 6 to 10 carbon atoms, arylenealkylene or alkylenearylene having 7 to 14 carbon atoms or arylenealkylenearylene having 13 to 16 carbon atoms, and in which $R_4$ is as defined above.

Preferred units of the formula I are units of the formula III

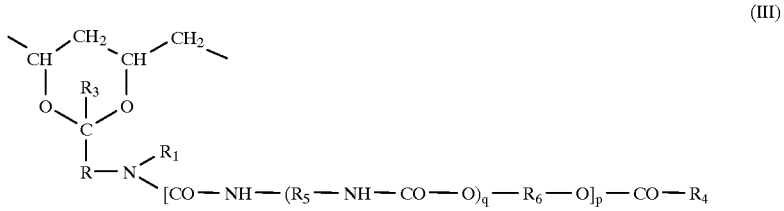

(III)

in which R is lower alkylene, $R_1$ is hydrogen or lower alkyl, p has the value zero or one, q has the value zero or one, $R_4$ is an olefinically unsaturated, crosslinkable radical having 2 to 8 carbon atoms, and $R_5$ and $R_6$, independently of one another, are lower alkylene having 2 to 8 carbon atoms, arylene having 6 to 12 carbon atoms, a saturated bivalent cycloaliphatic group having 6 to 10 carbon atoms, arylenealkylene or alkylenearylene having 7 to 14 carbon atoms or arylenealkylenearylene having 13 to 16 carbon atoms.

Alkylene R has up to 12 carbon atoms, preferably up to 8 carbon atoms, and can be linear or branched. Suitable examples include octylene, hexylene, pentylene, butylene, propylene, ethylene, methylene, 2-propylene, 2-butylene and 3-pentylene. Lower alkylene R preferably has up to 6, particularly preferably up to 4 carbon atoms. Methylene and butylene are particularly preferred.

$R_1$ is preferably hydrogen or lower alkyl having up to seven, in particular up to four, carbon atoms, in particular hydrogen.

Lower alkylene $R_5$ or $R_6$ preferably has 2 to 6 carbon atoms and is, in particular, linear. Suitable examples include propylene, butylene, hexylene, dimethylethylene and, particularly preferably, ethylene.

Arylene $R_5$ or $R_6$ is preferably phenylene, which is unsubstituted or substituted by lower alkyl or lower alkoxy, in particular 1,3-phenylene or 1,4-phenylene or methyl-1,4-phenylene.

A saturated bivalent cycloaliphatic group $R_5$ or $R_6$ is preferably cyclohexylene or cyclohexylene(lower alkylene), for example cyclohexylenemethylene, which is unsubstituted or substituted by one or more methyl groups, for example trimethylcyclohexylenemethylene, for example the bivalent isophorone radical.

The arylene unit of alkylenearylene or arylenealkylene $R_5$ or $R_6$ is preferably phenylene, unsubstituted or substituted by lower alkyl or lower alkoxy, and the alkylene unit thereof is preferably lower alkylene, such as methylene or ethylene, in particular methylene. Radicals $R_5$ or $R_6$ of this type are therefore preferably phenylenemethylene or methylenephenylene.

Arylenealkylenearylene $R_5$ or $R_6$ is preferably phenylene(lower alkylene)phenylene having up to 4 carbon atoms in the alkylene unit, for example phenyleneethylenephenylene.

The radicals $R_5$ and $R_6$ are preferably, independently of one another, lower alkylene having 2 to 6 carbon atoms, phenylene, unsubstituted or substituted by lower alkyl, cyclohexylene or cyclohexylene(lower alkylene), unsubstituted or substituted by lower alkyl, phenylene(lower alkylene), (lower alkylene)phenylene or phenylene(lower alkylene)phenylene.

For the purposes of this invention, the term "lower" in connection with radicals and compounds denotes, unless defined otherwise, radicals or compounds having up to 7 carbon atoms, preferably having up to 4 carbon atoms.

Lower alkyl has, in particular, up to 7 carbon atoms, preferably up to 4 carbon atoms, and is, for example, methyl, ethyl, propyl, butyl or tert-butyl.

Lower alkoxy has, in particular, up to 7 carbon atoms, preferably up to 4 carbon atoms, and is, for example, methoxy, ethoxy, propoxy, butoxy or tert-butoxy.

The olefinically unsaturated, crosslinkable radical $R_4$ having 2 to 24 carbon atoms is preferably alkenyl having 2 to 24 carbon atoms, in particular alkenyl having 2 to 8 carbon atoms, particularly preferably alkenyl having 2 to 4 carbon atoms, for example ethenyl, 2-propenyl, 3-propenyl, 2-butenyl, hexenyl, octenyl or dodecenyl. Ethenyl and 2-propenyl are preferred, so that the —CO—$R_4$ group is the acyl radical of acrylic acid or methacrylic acid.

The bivalent group —$R_5$—NH—CO—O— is present if q is one and absent if q is zero. Polymers containing a crosslinkable group in which q is zero are preferred.

The bivalent group —CO—NH—($R_5$—NH—CO—O)$_q$—$R_6$—O— is present if p is one and absent if p is zero. Polymers containing a crosslinkable group in which p is zero are preferred.

In the polymers comprising units containing a crosslinkable group in which p is one, the index q is preferably zero. Particular preference is given to polymers comprising a crosslinkable group in which p is one, the index q is zero and $R_5$ is lower alkylene.

Preferred units are units of the formula III in which R is lower alkylene having up to 6 carbon atoms, p is zero and $R_4$ is alkenyl having 2 to 8 carbon atoms.

A further preferred polymer comprising a unit containing crosslinkable groups is therefore in particular one comprising units of the formula III in which R is lower alkylene having up to 6 carbon atoms, p is one, q is zero, $R_6$ is lower alkylene having 2 to 6 carbon atoms, and $R_4$ is alkenyl having 2 to 8 carbon atoms, or units of the formula III in which R is lower alkylene having up to 6 carbon atoms, p is one, q is one, $R_5$ is lower alkylene having 2 to 6 carbon atoms, phenylene, unsubstituted or substituted by lower alkyl, cyclohexylene or cyclohexylene(lower alkylene), unsubstituted or substituted by lower alkyl, phenylene(lower alkylene), (lower alkylene)phenylene or phenylene(lower alkylene)phenylene, $R_6$ is lower alkylene having 2 to 6 carbon atoms and $R_4$ is alkenyl having 2 to 8 carbon atoms.

In addition to the units containing a crosslinkable group, the crosslinkable polymer also comprises, in accordance with the invention, units containing a group having an acid functionality and/or units containing a group having a basic functionality.

The unit containing a group having a basic functionality is, for example, a unit in which the basic group is a primary, secondary or tertiary amino group or a quaternary ammonium group.

Examples of such units are those of the formula IV

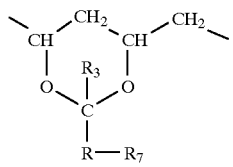
(IV)

in which R and $R_3$ are as defined under the formula I, and $R_7$ is a basic, primary, secondary or tertiary amino group or a quaternary amino group of the formula V

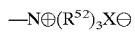
(V)

in which each R', independently of the others, is hydrogen or a $C_1$–$C_4$alkyl radical, and X is a counterion, for example $HSO_4^\ominus$, $F^\ominus$, $Cl^\ominus$, $Br^\ominus$, $I^\ominus$, $CH_3COO^\ominus$, $OH^\ominus$, $BF^\ominus$ or $H_2PO_4^\ominus$. R is preferably lower alkylene, in particular methylene or ethylene.

The radicals $R_7$ are, in particular, amino, mono- or di(lower alkyl)amino, mono- or diphenylamino, (lower alkyl)phenylamino or tertiary amino incorporated into a heterocyclic ring, for example —$NH_2$, —NH—$CH_3$, —N($CH_3$)$_2$, —NH($C_2H_5$), —N($C_2H_5$)$_2$, —NH(phenyl), —N($C_2H_5$)phenyl or

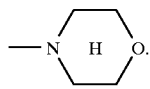

Radicals of the formula V are preferably those in which R' is hydrogen or $C_1$–$C_3$alkyl, and X is halide, acetate or phosphite, for example —$N^\oplus(C_2H_5)_3CH_3COO^\ominus$, —$N^\oplus(C_2H_5)_3Cl^\ominus$ and —$N^\oplus(C_2H_5)_3H_2PO_4^\ominus$.

$R_7$ is particularly preferably $NH_2$ or $R_3$ is hydrogen and X is halide, so that the radical of the formula V is, for example, $NH_3^\oplus Cl^\ominus$.

The unit containing an acidic group is, for example, a unit in which the acid group is a sulfonic acid group or a —COOH group, derived from a monobasic, dibasic, tribasic, aliphatic or aromatic, organic, saturated or unsaturated acid.

This unit is preferably a unit of the formula VI

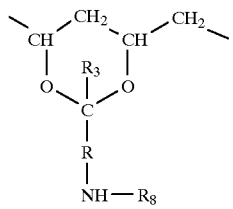
(VI)

in which R and $R_3$ are as defined under the formula I, and $R_8$ is the radical of a monobasic, dibasic or tribasic aliphatic or aromatic, organic, saturated or unsaturated acid or sulfonic acid.

Preferred radicals $R_8$ are derived, for example, from chloroacetic acid, succinic acid, glutaric acid, adipic acid, pimelic acid, maleic acid, fumaric acid, itaconic acid, citraconic acid, acrylic acid, methacrylic acid, phthalic acid and trimellitic acid.

In addition to the units of the formulae I, IV or VI, the novel water-soluble, polymers can also comprise further modifier units. Of the many possibilities for such modifiers, the following are mentioned by way of example:

Further units containing crosslinkable groups are, for example, those of the formulae A or B

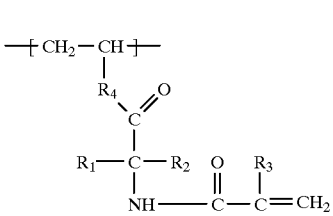
(A)

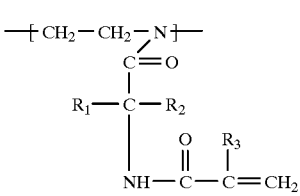
(B)

in which $R_1$ and $R_2$ embody amino acid radicals and are, independently of one another: hydrogen, a $C_1$–$C_8$alkyl group, an aryl group or a cyclohexyl group, these groups being unsubstituted or monosubstituted or polysubstituted, $R_3$ is hydrogen or a $C_1$–$C_4$alkyl group, and $R_4$ is an —O— or —NH— bridge.

Further units containing crosslinkable groups are, for example, those of the formula C

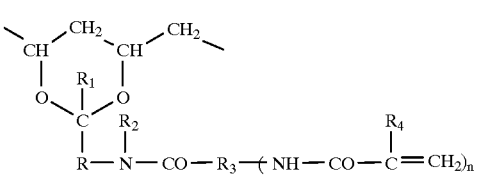
(C)

in which

R is a linear or branched bivalent radical of a $C_1$–$C_{12}$alkane, preferably of a $C_1$–$C_6$alkane, $R_1$ is hydrogen, a $C_1$–$C_6$alkyl group or a cycloalkyl group, preferably a cyclohexyl group, $R_2$ is hydrogen or a $C_1$–$C_6$alkyl radical, $R_3$ is the

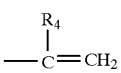

group if n=0, or the

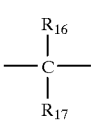

bridge if n=1, $R_4$ is hydrogen or $C_1$–$C_4$alkyl, n is zero or 1, preferably 0, and $R_{16}$ and $R_{17}$ independently of one another, are hydrogen, linear or branched $C_1$–$C_8$alkyl, aryl, preferably phenyl, or cyclohexyl;

or those of the formula D $$-\!\!\!+\!CH_2\!-\!CH\!+\!\!\!-\atop{\underset{\underset{\underset{R_{15}-C=CH_2}{|}}{(CH_2)_p}}{\underset{C=O}{|}}}\atop{\underset{|}{O}} \quad (D)$$

in which $R_{15}$ is hydrogen or a $C_1$–$C_4$alkyl group, in particular $CH_3$, and p is from zero to 6, preferably from zero to 2, especially zero.

Units which contain a bound photoinitiator are, in particular, those of the formula E $$\text{(E)}$$

in which
BR is an $$-\!\text{NH}\!-\!\text{CO}\!-\!\!(CH_2)_o\!-\!\quad \text{or} \quad -\!\text{N}\!-\!\!(CH_2)_r\!-\!\atop{\underset{R_7}{|}}$$

bridge or a quaternary salt thereof
which has the formula $$-\!\!\overset{\oplus}{\text{N}}\!-\!\!(CH_2)_r\!-\!Y^{\ominus},\atop{\underset{R_7}{|}}\atop{\overset{R_8}{|}}$$

PI is the radical of a photoinitiator from the class consisting of the benzoins, such as benzoin ethers, for example benzoin methyl ether, benzoin ethyl ether, benzoin isopropyl ether and benzoin phenyl ether, and benzoin acetate; acetophenones, such as acetophenone, 2,2-dimethoxyacetophenone and 1,1-dichloroacetophenone; benzil, benzil ketals, such as benzil dimethyl ketal and benzil diethyl ketal; anthraquinones, such as 2-methylanthraquinone, 2-ethylanthraquinone, 2-tert-butyl anthraquinone, 1-chloroanthraquinone and 2-amylanthraquinone; furthermore benzophenones, such as benzophenone and 4,4'-bis(N,N'-dimethylamino) benzophenone; thioxanthones and xanthones; acridine derivatives; phenazine derivatives; quinoxaline derivatives; and 1-aminophenyl ketones and in particular 1-hydroxyphenyl ketones, in particular those of the formula $$-\!X\!-\!\!\underset{}{\underbrace{\phantom{XXX}}}\!-\!\!\overset{O}{\underset{\|}{C}}\!-\!\!\overset{R_9}{\underset{\underset{R_{11}}{|}}{C}}\!-\!R_{10}$$

in which

X is —O—, —S— or —N($R_{12}$)—,

Y is a counterion, such as $H_2SO_4^\ominus$, $F^\ominus$, $Cl^\ominus$, $Br^\ominus$, $I^\ominus$, $CH_3COO^\ominus$, $OH^\ominus$, $BF_4^\ominus$ or $H_2PO_4^\ominus$, $R_3$ is hydrogen, a $C_1$–$C_6$alkyl group or a cycloalkyl group, $R_7$ is hydrogen; unsubstituted or substituted, linear or branched $C_1$–$C_{12}$alkyl; the —$(CH_2)_r$—PI group or the —CO—$R_{13}$ group, in which $R_{13}$ is linear or branched $C_1$–$C_6$alkyl which is unsubstituted or substituted by —COOH or acrylamide, or an unsubstituted, linear or branched radical of a $C_3$–$C_8$olefin, $R_8$ is hydrogen, or unsubstituted or substituted, linear or branched $C_1$–$C_4$alkyl so long as $R_7$ is not —CO—$R_{13}$, $R_9$ is unsubstituted or substituted, linear or branched $C_1$–$C_6$alkyl, unsubstituted or substituted, linear or branched $C_1$–$C_6$alkoxy, a 6-membered carbocyclic or heterocyclic ring, or an unsubstituted linear or branched radical of a $C_3$–$C_8$olefin, $R_{10}$ is a group of the formula —$OR_{14}$ or $$-\!OR_{14} \quad \text{or} \quad -\!\text{N}\!\!\overset{R_{15}}{\underset{R_{16}}{\diagdown}}\!,$$

$R_{11}$ is unsubstituted or substituted, linear or branched $C_1$–$C_6$alkyl, a 6-membered carbocyclic or heterocyclic ring, an unsubstituted, linear or branched radical of a $C_3$–$C_8$olefin, or aryl, where $R_9$ and $R_{11}$ together can also be cyclized to form a 5- or 6-membered carbocyclic ring, $R_{12}$ is hydrogen or unsubstituted, linear or branched $C_1$–$C_4$alkyl, $R_{14}$ is hydrogen or unsubstituted or substituted, linear or branched $C_1$–$C_4$alkyl, $R_{15}$ and $R_{16}$, independently of one another, are unsubstituted, linear or branched $C_1$–$C_4$alkyl, or $R_{15}$ and $R_{16}$ can be bonded together to form a 5- or 6-membered heterocyclic ring, m is 0 or 1, n is a number from 1 to 12, o is a number from 1 to 6, and r is a number from 2 to 6, where substituted radicals are substituted, in particular, by $C_1$–$C_4$alkyl or by $C_1$–$C_4$alkoxy, with the following provisos:

if the BR bridge is a quaternary salt, n is a number from 2 to 12;

$R_{14}$ is not hydrogen if $R_9$ is a $C_1$–$C_6$alkoxy radical; and $R_7$ is —CO—$R_{13}$ when n=1.

Examples of units containing crosslinkable groups bonded via urethane or further modifier groups bonded via urethane are those of the formula F or G (F)

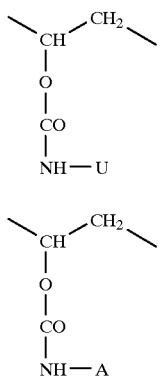

(G)

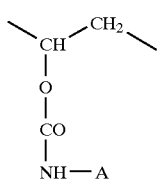

in which

U is the

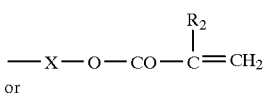

or

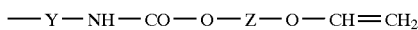

group,

X is a bridge having 2 to 12 carbon atoms, in particular an aliphatic, cycloaliphatic or aromatic bridge, especially alkylene, cyclohexylene or phenylene, which are unsubstituted or in particular substituted by lower alkyl, $R_2$ is hydrogen or a $C_1$–$C_4$alkyl group, Y is a bridge having 7 to 12 carbon atoms with the same preferences as for X, Z is a $C_2$- to $C_{12}$alkylene bridge, which may be interrupted once or more than once by oxygen atoms, and A is an organic radical having 1 to 18 carbon atoms, in particular an aliphatic, cycloaliphatic or aromatic radical, especially alkyl, cycloalkyl or phenyl, which are unsubstituted or in particular substituted by lower alkyl.

Examples of units containing a covalently bonded reactive dye radical are those of the formula H, I, J or K (H)

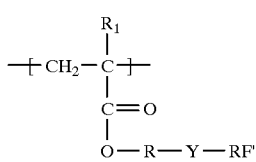

(I)

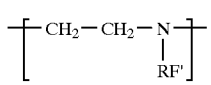

(J)

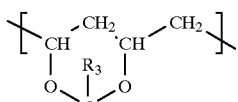

(K)

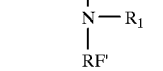

in which

RF' is a radical of the formula

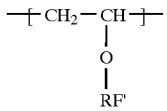

in which

D is the radical of an organic dye,
$R_{14}$ is a divalent electron-withdrawing group,
U is hydrogen or halogen,
R is the divalent radical of a $C_1$–$C_{12}$alkane,
$R_1$ is hydrogen or $C_1$–$C_4$alkyl,
$R_3$ is hydrogen, $C_1$–$C_6$alkyl or cycloalkyl, and
Y is —O— or —N($R_1$)—.

The crosslinkable polymer (prepolymer) used in accordance with the invention comprises the units containing one or more different crosslinkable group(s) and, if desired, the units containing the further modifier(s), reactive dye radicals and photoinitiators, etc. in a total amount of from about 0.5 to 80%, preferably from 1 to 50%, advantageously from 1 to 25%, in particular from 2 to 15%, particularly preferably from 2 to 10%, based on the number of functional groups in the starting polymer, for examply hydroxyl groups in the polyvinyl alcohol.

Polymers (prepolymers) which can be crosslinked in accordance with the invention and are intended for the production of contact lenses, comprise, in particular, from about 0.5 to about 25%, especially from about 1 to 15%, particularly preferably from about 2 to 12%, of these units.

The polyhydroxyl compounds, in particular the polyvinyl alcohols which can be derivatized in accordance with the invention, preferably have a mean molecular weight of at least 2000. The upper limit to their molecular weight is up to 1,000,000. They preferably have a molecular weight of up to 300,000, in particular of up to 100,000, very particularly preferably of up to about 50,000.

Polyhydroxyl compounds which are suitable for the purposes of the invention, in particular polyvinyl alcohols, usually have principally a poly(2-hydroxy)ethylene structure. However, the polyvinyl alcohols derivatized in accordance with the invention can also contain hydroxyl groups in the form of 1,2-glycols, such as copolymer units of 1,2-dihydroxyethylene, as can be obtained, for example, by alkaline hydrolysis of vinyl acetate-vinylene carbonate copolymers.

In addition, the polyvinyl alcohols derivatized in accordance with the invention can also contain small proportions, for example of up to 20%, preferably of up to 5%, of copolymer units of ethylene, propylene, acrylamide, methacrylamide, dimethacrylamide, hydroxyethyl methacrylate, methyl methacrylate, methyl acrylate, ethyl acrylate, vinylpyrrolidone, hydroxyethyl acrylate, allyl alcohol, styrene or similar comonomers usually used.

Polyvinyl alcohols (PVA) which can be used as starting polymers are commercially available polyvinyl alcohols, for example Vinol® 107 from Air Products (MW=22,000 to 31,000, 98–98.8% hydrolysed), Polysciences 4397 (MW= 25,000, 98.5% hydrolysed), BF 14 from Chan Chun, Elvanol® 90-50 from DuPont and UF-120 from Unitika. Other producers are, for example, Nippon Gohsei (Gohsenol®), Monsanto (Gelvatol®), Wacker (Polyviol®) or the Japanese producers Kuraray, Denki and Shin-Etsu. However, it is advantageous to use Mowiol® products from Hoechst, in particular those of the 3-83, 4-88, 4-98, 6-88, 6-98, 8-88, 8-98, 10-98, 20-98, 26-88 and 40-88 type.

The PVAs are prepared by basic or acidic, partial or virtually complete hydrolysis of polyvinyl acetate.

As mentioned above, it is also possible to use copolymers of hydrolysed or partially hydrolysed vinyl acetate, which are obtainable, for example, as hydrolysed ethylene-vinyl acetate (EVA), or vinyl chloride-vinyl acetate, N-vinylpyrrolidone-vinyl acetate and maleic anhydride-vinyl acetate.

Polyvinyl alcohol is usually prepared by hydrolysis of the corresponding homopolymeric polyvinyl acetate. In a preferred embodiment, the polyvinyl alcohol derivatized in accordance with the invention comprises less than 50% of polyvinyl acetate units, in particular less than 20% of polyvinyl acetate units. Preferred amounts of residual acetate units in the polyvinyl alcohol derivatized in accordance with the invention are, based on the total amount of vinyl alcohol units and acetate units, from about 2 to 20%, preferably from about 2 to 16%, in particular from 2 to 12%, especially from 0.5 to 3%.

The crosslinkable polymers comprising units of the formula I and IV, I and VI and I, IV and VI can be prepared in a manner known per se. For example, a polyvinyl alcohol having a molecular weight of at least about 2000 which comprises units of the formula VII

—CH(OH)—CH$_2$— (VII)

can be reacted with from about 0.5 to 80%, based on the number of hydroxyl groups of polyvinyl alcohol, of a compound of the formula VIII

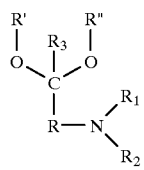

(VIII)

and of a compound of the formula IX

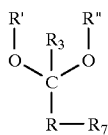

(IX)

and/or of a compound of the formula X

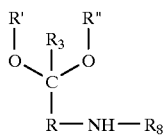

(X)

in which R' and R", independently of one another, are hydrogen, lower alkyl or lower alkanoyl, such as acetyl or propionyl, and the other variables R, R$_1$, R$_2$, R$_3$, R$_7$ and R$_8$ are as defined under the formulae I, IV and VI, in particular in acidic medium in a one-pot process.

The acetals and ketals employed can also be replaced by the corresponding aldehydes or ketones.

Some of the acetals/ketals of the formulae VIII, IX and X are known and can be prepared in a manner known per se.

Contact lenses based on polyvinyl alcohol have already been disclosed. For example, some specific acetals containing crosslinkable groups have already been disclosed. In this connection, we refer, for example, to EP 201 693, EP 215 245 and EP 211 432. EP 201 693 describes, inter alia, acetals of unbranched aldehydes having 2 to 11 carbon atoms carrying a terminal amino group which is substituted by a C$_3$–C$_{24}$olefinically unsaturated organic radical. This organic radical contains a functionality which withdraws electrons from the nitrogen atom, and furthermore the olefinically unsaturated functionality is polymerizable. EP 201 693 also claims products of the reaction of the acetals characterized above with a 1,2-diol, a 1,3-diol, a polyvinyl alcohol or a cellulose. However, such products are not described directly. In addition, this reference gives no indication that the polymers may additionally comprise units containing an acidic functionality and/or a basic functionality.

If one of the acetals of EP 201 693 is mentioned at all in connection with, for example, polyvinyl alcohol, as is the case, inter alia, in Example 17 of that patent application, the acetal which can be polymerized via its olefinic group is first copolymerized with, for example, vinyl acetate. The resultant copolymer is then reacted with polyvinyl alcohol, and an emulsion having a solids content of 37%, a pH of 5.43 and a viscosity of 11,640 cps is obtained.

Surprisingly, the novel crosslinkable polymers comprising units containing crosslinkable groups, units containing acidic groups and/or units containing basic groups are extremely stable. This is unexpected to the person skilled in the art since higher-functional acrylates, for example, usually require stabilization. If such compounds are not stabilized, rapid polymerization occurs. However, spontaneous crosslinking due to homopolymerization does not occur with the novel crosslinkable polymers. The crosslinkable polymers comprising units containing crosslinkable groups, units containing acidic groups and/or units containing basic groups can, in addition, be purified in a manner known per se, for example by precipitation with acetone, dialysis or ultrafiltration, particular preference being given to ultrafiltration. This purification operation allows these crosslinkable polymers to be obtained in extremely pure form, for example as concentrated aqueous solutions which are free or at least substantially free from reaction products, such as salts, and from starting materials or other non-polymeric constituents.

The preferred method for the purification of the novel crosslinkable polymers, namely ultrafiltration, can be carried out in a manner known per se. It is possible to carry out the ultrafiltration repeatedly, for example from two to ten times. Alternatively, the ultrafiltration can also be carried out continuously until the desired degree of purity has been achieved. The desired degree of purity can in principle be as great as desired. A suitable measure of the degree of purity is, for example, the chloride content of the purified solution, which can easily be determined.

The novel crosslinkable polymers are water-soluble and can be crosslinked in an extremely effective and targeted manner, in particular by photochemical crosslinking.

The present invention therefore furthermore relates to a crosslinked, in particular photocrosslinked polymer which can be obtained by photocrosslinking a crosslinkable polymer comprising units of the formulae I and IV and/or VI or a mixture of crosslinkable polymers in the presence or absence of an additional vinylic comonomer. These crosslinked polymers (hydrogels) preferably obtained by photocrosslinking are insoluble in water.

In the case of photochemical crosslinking (photocrosslinking), it is expedient to add a photoinitiator which is capable of initiating free-radical crosslinking. The crosslinking can then be initiated by actinic or ionizing radiation.

The photocrosslinking is carried out in a suitable solvent. Such solvents are in principle all those which dissolve the crosslinkable polymer, in particular based on polyvinyl alcohol, and any vinylic comonomers additionally used.

The photocrosslinlking is preferably carried out from an aqueous solution of the novel water-soluble crosslinkable polymers, which can be obtained as a result of the preferred purification step, namely ultrafiltration, if desired after addition of an additional vinylic comonomer.

The process for the preparation of the novel crosslinked polymers comprises, for example, crosslinking, in particular photocrosslinking, a novel crosslinkable polymer, in particular in essentially pure form, ie. for example, after a single or repeated ultrafiltration, in particular in aqueous solution, in the presence or absence of an additional vinylic comonomer.

The vinylic comonomer which can additionally be used in accordance with the invention in the photocrosslinking can be hydrophilic, hydrophobic or a mixture of hydrophobic and hydrophilic vinylic monomers. Suitable vinylic monomers include, in particular, those which are usually used in the production of contact lenses. The term "hydrophilic vinylic monomer" is taken to mean a monomer which, as a homopolymer, typically gives a polymer which is soluble in water or is capable of absorbing at least 10% by weight of water. Analogously, the term "hydrophobic vinylic monomer" is taken to mean a monomer which, as a homopolymer, typically gives a polymer which is insoluble in water or is capable of absorbing less than 10 per cent by weight of water.

In general, from about 0.5 to 80 units of a typical vinylic comonomer react per unit containing a crosslinkable group.

If a vinylic comonomer is used, the photocrosslinked novel polymers preferably comprise from about 1 to 15 per cent, particularly preferably from about 3 to 8 per cent, of units containing a crosslinkable, acidic and/or basic group of the formulae 1, IV and VI, based, for example, on the number of hydroxyl groups of the polyvinyl alcohol, which are reacted with from about 0.5 to 80 units of the vinylic monomer.

The proportion of vinylic comonomers, if used, is preferably from 0.5 to 80 units, in particular from 1 to 30 units, particularly preferably from 5 to 20 units per unit containing a crosslinkable group.

It is furthermore preferred to use a hydrophobic vinylic comonomer or a mixture of a hydrophobic vinylic comonomer and a hydrophilic vinylic comonomer which comprises at least 50 per cent by weight of a hydrophobic vinylic comonomer. This allows the mechanical properties of the photocrosslinked polymer to be improved without drastically reducing the water content. However, both conventional hydrophobic vinylic comonomers and conventional hydrophilic vinylic comonomers are in principle suitable for the copolymerization with polyvinyl alcohol containing crosslinkable, acidic and/or basic groups.

Suitable hydrophobic vinylic comonomers include, without this being a comprehensive list, $C_1$–$C_{18}$alkyl acrylates and methacrylates, $C_3$–$C_{18}$alkylacrylamides and -methacrylamides, acrylonitrile, methacrylonitrile, vinyl $C_1$–$C_{18}$alkanoates, $C_2$–$C_{18}$alkenes, $C_2$–$C_{18}$haloalkenes, styrene, $C_1$–$C_6$alkylstyrene, vinyl alkyl ethers in which the alkyl moiety has 1 to 6 carbon atoms, $C_2$–$C_{10}$perfluoroalkyl acrylates and methacrylates and correspondingly partially fluorinated acrylates and methacrylates, $C_3$–$C_{12}$perfluoroalkyl ethylthiocarbonylaminoethyl acrylates and -methacrylates, acryloxy- and methacryloxyalkylsiloxanes, N-vinylcarbazole, $C_1$–$C_{12}$alkyl esters of maleic acid, fumaric acid, itaconic acid, mesaconic acid and the like. Preference is given to, for example, $C_1$–$C_4$alkyl esters of vinylically unsaturated carboxylic acids having 3 to 5 carbon atoms or vinyl esters of carboxylic acids having up to 5 carbon atoms.

Examples of suitable hydrophobic vinylic comonomers include methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethylthiocarbonylaminoethyl methacrylate, isobornyl methacrylate, trifluoroethyl methacrylate, hexafluoroisopropyl methacrylate, hexafluorobutyl methacrylate, tris(trirnethylsilyloxy)silylpropyl methacrylate, 3-methacryloxypropylpentamethyldisiloxane and bis(methacryloxypropyl)tetramethyldisiloxane.

Suitable hydrophilic vinylic comonomers include, without this being a comprehensive list, hydroxy-substituted lower alkyl acrylates and methacrylates, acrylamide, methacrylamide, lower alkylacrylamides and -methacrylamides, methoxylated acrylates and methacrylates, hydroxy-substituted lower alkylacrylamides and -methacrylamides, hydroxy-substituted lower alkyl vinyl ethers, sodium ethylenesulfonate, sodium styrenesulfonate, 2-acrylamido-2-methylpropanesulfonic acid, N-vinylpyrrole, N-vinylsuccinimide, N-vinylpyrrolidone, 2- and 4-vinylpyridine, acrylic acid, methacrylic acid, amino- (where the term "amino" also covers quaternary ammonium), mono(lower alkyl)amino- or di(lower alkyl)amino(lower alkyl) acrylates and methacrylates allyl alcohol and the like. Preference is given to, for example, hydroxy-substituted $C_2$–$C_4$alkyl (meth)acrylates, five- to seven-membered N-vinyllactams, N,N-di-$C_1$–$C_4$alkyl(meth)acrylamides and vinylically unsaturated carboxylic acids having a total of 3 to 5 carbon atoms.

Examples of suitable hydrophilic vinylic comonomers include hydroxyethyl methacrylate, hydroxyethyl acrylate, acrylamide, methacrylamide, dimethylacrylamide, allyl alcohol, vinylpyridine, vinylpyrrolidone, glycerol methacrylate, N-(1,1-dimethyl-3-oxobutyl)acrylamide and the like.

Preferred hydrophobic vinylic comonomers are methyl methacrylate and vinyl acetate.

Preferred hydrophilic vinylic comonomers are 2-hydroxymethyl methacrylate, N-vinylpyrrolidone and acrylamide.

The novel crosslinkable polymers can be converted into mouldings, in particular contact lenses, in a manner known per se, for example by carrying out the crosslinking of novel crosslinkable polymers in a suitable contact-lens mould. The invention therefore furthermore relates to mouldings essentially comprising a novel crosslinked polymer made from a novel crosslinkable polymer comprising units containing crosslinkable groups, acidic groups and/or basic groups of the formulae I, IV and/or VI. Further examples of novel mouldings, besides contact lenses, are biomedical mouldings and mouldings for specifically ophthalmic purposes, for example intraocular lenses, eye bandages, mouldings which can be used in surgery, such as heart valves, artificial arteries or the like, furthermore films and membranes, for example membranes for diffusion control, photostructurable films for information storage, and photoresist materials, for example membranes and mouldings for etch resists and screen printing resists.

A specific embodiment of the invention relates to contact lenses which comprise a novel crosslinked polymer made from a crosslinkable polymer comprising units containing crosslinkable, acidic and/or basic groups or essentially comprising or consisting of a novel crosslinkable polymer. Contact lenses of this type have a range of unusual and extremely advantageous properties, including, for example, excellent compatibility with the human cornea, based on a balanced ratio between water content (about 50–90% by weight, in particular 60–85% by weight), high oxygen permeability and very good mechanical properties, for example transparency, clarity, freedom from stresses and tear strength. In addition, the novel contact lenses have high dimensional stability. Even after autoclaving one or more times at, for example, about 120° C. for about 30–40 minutes, no changes in shape are observed.

It is furthermore emphasized that the novel contact lenses, ie. those comprising a crosslinked polymer made from a crosslinkable polymer comprising units containing crosslinkable, acidic and/or basic groups, can be produced very simply and efficiently compared with the prior art. This is due to a number of factors. Firstly, the starting materials, such as the polymer backbones, are inexpensive to obtain or prepare. Secondly, it is advantageous that the crosslinkable polymers are surprisingly stable, so that they can be subjected to very substantial purification. The crosslinking can therefore be carried out using a crosslinkable polymer which requires virtually no subsequent purification, such as, in particular, complex extraction of unpolymerized constituents. Furthermore, the crosslinking, in particular photocrosslinking, can be carried out in purely aqueous solution, so that a subsequent hydration step is unnecessary. Finally, the crosslinking takes place within less than 5 minutes, so that the process for the production of the novel contact lenses can be designed to be extremely economical from this point of view too.

All the above advantages naturally apply not only to contact lenses, but also to the other mouldings mentioned. The totality of the various advantageous aspects in the production of novel mouldings results in novel mouldings being particularly suitable as mass-produced articles, for example as contact lenses, which are worn for a short time span (from about 1 to 4 days) and are then replaced by new lenses.

The present invention furthermore relates to the production of the novel mouldings, in particular the novel contact lenses. These processes are illustrated below using the example of contact lenses. However, these processes can also be used for the other mouldings mentioned.

The novel contact lenses can be produced in a manner known per se, for example in a conventional spin-casting mould, as described, for example, in U.S. Pat. No. 3,408,429, or by the full-mould process in a static mould, as described, for example, in U.S. Pat. No. 4,347,198.

The present invention also relates to a novel process for the production of polymeric mouldings, in particular contact lenses, in which a water-soluble crosslinkable polymer containing crosslinkable, acidic and/or basic groups is crosslinked in solution, and to mouldings, in particular contact lenses, obtainable by this process. The mouldings obtainable by crosslinking in this way are insoluble, but swellable, in water.

In detail, this process for the production of mouldings, in particular contact lenses, comprises the following steps:

a) Preparation of an essentially aqueous solution of a crosslinkable polymer comprising units containing a crosslinkable group, units containing an acidic group and units containing a basic group, or an essentially aqueous solution of a mixture of at least two different crosslinkable polymers, where at least one polymer comprises units containing a crosslinkable group and units containing an acidic group, and where at least one further polymer comprises units containing a crosslinkable group and units containing a basic group,
b) introduction of the resultant solution into a mould,
c) initiation of the crosslinking in water or in an organic solvent in which the water-soluble, crosslinkable polymer is dissolved, and
d) opening of the mould so that the moulding can be removed.

Unless expressly excluded below, the comments and preferences given above in connection with the crosslinkable polymers comprising units containing crosslinkable, acidic and/or basic groups of the formulae I, IV and VI and the comments and preferences given in connection with the processes for the preparation of polymers and production of mouldings, in particular contact lenses, from these crosslinkable polymers also apply in connection with the above-described process comprising steps a), b), c) and d). This statement applies to all the cases in which the comments and preferences in connection with crosslinkable polymers comprising units containing crosslinkable, acidic and/or basic groups can be applied appropriately to the process described above.

The crucial criteria regarding whether a crosslinkable polymer can be employed in the novel process are that the crosslinkable polymer is soluble in water and that it comprises units containing a crosslinkable group, units containing an acidic group and/or units containing a basic group, or that it is a mixture of at least two different water-soluble crosslinkable polymers, where at least one polymer comprises units containing a crosslinkable group and units containing an acidic group and where at least one further polymer comprises units containing a crosslinkable group and units containing a basic group.

An essentially aqueous solution of the novel crosslinkable polymer can be prepared in a manner known per se, for example by isolating the crosslinkable polymer, for example in pure form, ie. free from undesired constituents, and dissolving it in an essentially aqueous medium.

The criterion that the crosslinkable polymer is soluble in water is, for the purposes of the invention, taken to mean in particular that the crosslinkable polymer is soluble in an essentially aqueous solution at 20° C. in a concentration of from about 3 to 90 per cent by weight, preferably from about 5 to 60 per cent by weight, in particular from about 10 to 60 per cent by weight. If possible in individual cases, crosslinkable polymer concentrations of greater than 90% are also included for the purposes of the invention. Particular preference is given to crosslinkable polymer concentrations in solution of from about 15 to about 50 per cent by weight, in particular from about 15 to about 40 per cent by weight, for example from about 25 to about 40 per cent by weight.

For the purposes of this invention, essentially aqueous solutions of the crosslinkable polymer include in particular solutions in water, in aqueous salt solutions, in particular in aqueous salt solutions having an osmolarity of from about 200 to 450 milliosmol in 1000 ml (unit: mOsm/l), preferably an osmolarity of from about 250 to 350 mOsm/l, in particular about 300 mOsm/l, or in mixtures of water or aqueous salt solutions with physiologically acceptable polar organic solvents, for example glycerol. Preference is given to solutions of the crosslinkable polymer in water alone.

The aqueous salt solutions are advantageously solutions of physiologically acceptable salts, such as buffer salts, for example phosphate salts, which are conventional in the area of contact-lens care, or isotonicizing agents, in particular alkali metal halides, for example sodium chloride, which are conventional in the area of contact-lens care, or solutions of mixtures thereof. An example of a particularly suitable salt solution is an artificial, preferably buffered tear fluid whose pH and osmolarity have been matched to natural tear fluid, for example an unbuffered, preferably buffered for example by phosphate buffer, sodium chloride solution whose osmolarity and pH conform to the osmolarity and pH of human tear fluid.

The above-defined, essentially aqueous solutions of the crosslinkable polymer are preferably pure solutions, ie. those which are free or essentially free from undesired constituents. Particular preference is given to solutions of the crosslinkable polymer in pure water or in an artificial tear fluid as described above.

The viscosity of the solution of the crosslinkable polymer in the essentially aqueous solution is unimportant over broad limits. However, it should preferably be a flowable solution which can be shaped without stresses.

The mean molecular weight of the crosslinkable polymer is likewise unimportant within broad limits. However, the crosslinkable polymer preferably has a molecular weight of from about 10,000 to about 200,000.

Suitable polymeric backbones, in addition to polyvinyl alcohol (PVA), are, as mentioned above, materials containing functional groups which are capable of covalently binding an acetal group or a ketal group or the corresponding aldehyde or the ketone containing a crosslinkable, acidic and/or basic group and those as have in some cases already been proposed as contact-lens materials, for example polymeric diols other than PVA, polymers comprising saccharides, polymers comprising vinylpyrrolidone, polymers comprising alkyl (meth)acrylates, polymers comprising alkyl (meth)acrylates which are substituted by hydrophilic groups, such as hydroxyl, carboxyl or amino groups, polyalkylene glycols, or copolymers or mixtures thereof.

As already mentioned, for a crosslinkable polymer to be suitable in the crosslinking process, it is essential that it is a water-soluble, crosslinkable polymer. However, the crosslinkable polymer is uncrosslinked or at least essentially uncrosslinked, so that it is water-soluble.

Furthermore, the crosslinkable polymer is advantageously stable in the uncrosslinked state, so that it can be subjected to purification, as described above in connection with compounds comprising units containing crosslinkable, acidic and/or basic groups. The crosslinkable polymers are preferably employed in the crosslinking process in the form of pure solutions. The crosslinkable polymers can be converted into the form of pure solutions as described below, for example.

The water-soluble, crosslinkable polymers used in the novel process can preferably be purified in a manner known per se, for example by precipitation with organic solvents, such as acetone, filtration and washing, extraction in a suitable solvent, dialysis or ultrafiltration, particular preference being given to ultrafiltration. This purification operation allows the crosslinkable polymers to be obtained in extremely pure form, for example as concentrated aqueous solutions, which are referred to hereinafter as pure or essentially pure. This term is understood to refer to a crosslinkable polymer or to a solution thereof which is free or at least substantially free from undesired constituents.

Undesired constituents in this context are generally all constituents which are physiologically undesired, especially monomeric, oligomeric or polymeric starting compounds used for the preparation of the water-soluble, crosslinkable polymer, or byproducts formed during the preparation of the water-soluble, crosslinkable polymer. Preferred degrees of purity of these constituents are less than 0.01%, in particular less than 0.001%, very particularly preferably less than 0.0001% (1 ppm). It is to be noted, however, that there may be present in the solution, for example by formation as byproducts during the preparation of the water-soluble, crosslinkable polymer, constituents which are not undesired from a physiological point of view, such as for example sodium chloride. Preferred degrees of purity of these constituents are less than 1%, in particular less than 0.1%, very particularly preferably less than 0.01%. In most cases such levels of constituents may be obtained by applying 3 to 4 repeated ultrafiltration cycles.

The preferred process for the purification of the crosslinkable polymers used in the crosslinking process, namely ultrafiltration, can be carried out in a manner known per se. The ultrafiltration can be carried out repeatedly, for example from two to ten times. Alternatively, the ultrafiltration can also be carried out continuously until the desired degree of purity has been achieved. The desired degree of purity can in principle be chosen to be as great as desired.

In a preferred embodiment of the process, an essentially aqueous solution of the crosslinkable polymer which is essentially free from undesired constituents, for example free from monomeric, oligomeric or polymeric starting compounds used for the preparation of the crosslinkable polymer, and/or free from by-products formed during the preparation of the crosslinkable polymer, is prepared in step a) and used further. This essentially aqueous solution is particularly preferably a purely aqueous solution or a solution in an artificial tear fluid as described above. It is furthermore preferred for the process to be carried out without addition of a comonomer, for example a vinylic comonomer.

Owing to the abovementioned measures and in particular owing to a combination of said measures, the crosslinking process is carried out using a solution of the crosslinkable polymer containing no or essentially no undesired constituents requiring extraction after crosslinking. It is therefore a particular feature of this preferred embodiment of the novel process that extraction of undesired constituents is not necessary after the crosslinking.

The novel process is therefore preferably carried out in such a way that the essentially aqueous solution of the crosslinkable polymer or polymers is free or essentially free from undesired constituents, in particular from monomeric, oligomeric or polymeric starting compounds used for the preparation of the crosslinkable polymer, or from by-products formed during the preparation of the crosslinkable polymer, and/or that the solution is used without addition of a comonomer.

An addition which may be added to the solution of the crosslinkable polymer is an initiator for the crosslinking so long as an initiator is necessary for crosslinking of the crosslinkable groups. This may be the case, in particular, if the crosslinking takes place by photocrosslinking, which is preferred in the novel process.

In the case of photocrosslinking, it is expedient to add an initiator which is capable of initiating free-radical crosslinking and is readily soluble in water. Examples thereof are known to the person skilled in the art; suitable photoinitiators which may be mentioned specifically are benzoins, such as benzoin, benzoin ethers, such as benzoin methyl ether, benzoin ethyl ether, benzoin isopropyl ether and benzoin phenyl ether, and benzoin acetate; acetophenones, such as acetophenone, 2,2-dimethoxyacetophenone and 1,1-dichloroacetophenone; benzil, benzil ketals, such as benzil dimethyl ketal and benzil diethyl ketal, anthraquinones, such as 2-methylanthraquinone, 2-ethylanthraquinone, 2-tert-butylanthraquinone, 1-chloroanthraquinone and 2-amylanthraquinone; furthermore triphenylphosphine, benzoylphosphine oxides, for example 2,4,6-trimethylbenzoyldiphenylphosphine oxide, benzophenones, such as benzophenone and 4,4'-bis(N,N'-dimethylamino) benzophenone; thioxanthones and xanthones; acridine derivatives; phenazine derivatives; quinoxaline derivatives and 1-phenyl-1,2-propanedione 2-O-benzoyl oxime; 1-aminophenyl ketones and 1-hydroxyphenyl ketones, such as 1-hydroxycyclohexylphenyl ketone, phenyl 1-hydroxyisopropyl ketone, 4-isopropylphenyl 1-hydroxyisopropyl ketone, 2-hydroxy-1-[4-(2-hydroxyethoxy)phenyl]-2-methylpropan-1-one, 1-phenyl-2-hydroxy-2-methylpropan-1-one, and 2,2-dimethoxy-1,2-diphenylethanone, all of which are known compounds.

Particularly suitable photoinitiators, which are usually used with a UV lamp as light source, are acetophenones, such as 2,2-dialkoxybenzophenones and hydroxyphenyl ketones, in particular the initiators known under the trade names IRGACURE® 2959 and IRGACURE® 1173.

Another class of photoinitiators usually employed when argon ion lasers are used are benzil ketals, for example benzil dimethyl ketal.

The photoinitiators are added in effective amounts, expediently in amounts of from about 0.1 to about 2.0% by weight, in particular from 0.3 to 0.5% by weight, based on the total amount of the crosslinkable polymer.

The resultant solution can be introduced into a mould using methods known per se, such as, in particular, conventional metering, for example dropwise. The novel contact lenses can be produced in a manner known per se, for example in a conventional spin-casting mould, as described, for example, in U.S. Pat. No. 3,408,429, or by the full-mould process in a static mould, as described, for example, in U.S. Pat. No. 4,347,198. Appropriate moulds are made, for example, of polypropylene. Examples of suitable materials for reusable moulds are quartz and saphire glass.

The crosslinkable polymers which are suitable in accordance with the invention can be crosslinked by irradiation with ionizing or actinic radiation, for example electron beams, X-rays, UV or VIS light, ie. electromagnetic radiation or particle radiation having a wavelength in the range from about 280 to 650 nm. Particularly suitable are UV lamps, He/Cd, argon ion or nitrogen or metal vapour or NdYAG laser beams with multiplied frequency. It is known to the person skilled in the art that each selected light source requires selection and, if necessary, sensitization of the suitable photoinitiator. It has been recognized that in most cases the depth of penetration of the radiation into the crosslinkable polymer and the rate are in direct correlation with the absorption coefficient and concentration of the photoinitiator.

If desired, the crosslinking can also be initiated thermally. It should be emphasized that the crosslinking, in particular photocrosslinking, can take place in a very short time in accordance with the invention, for example in less than five minutes, preferably in less than one minute, in particular in up to 30 seconds, particularly preferably as described in the examples.

Apart from water, which is preferred, the crosslinking medium can additionally be any medium in which the crosslinkable polymer is soluble. In the case of polyvinyl alcohol as the principal polymer backbone, all solvents which dissolve polyvinyl alcohol are suitable, such as alcohols, for example ethanol, glycols, glycerol, formamide, dimethylformamide, hexamethylphosphoric triamide, dimethyl sulfoxide, pyridine, nitromethane, acetonitrile, nitrobenzene, chlorobenzene, trichloromethane, dioxane and aqueous solutions of tetraalkylammonium bromide and iodide.

The opening of the mould so that the moulding can be removed can be carried out in a manner known per se. Whereas the process proposed in the prior art (U.S. Pat. Nos. 3,408,429 and 4,347,198) requires subsequent purification steps at this point, for example by extraction, and also steps for hydration of the resultant mouldings, in particular contact lenses, such steps are unnecessary here.

Since the solution of the crosslinkable polymer preferably comprises no undesired low-molecular-weight constituents, the crosslinked product also comprises no such constituents. Subsequent extraction is therefore unnecessary. Since the crosslinking is carried out in an essentially aqueous solution, subsequent hydration is unnecessary. These two advantages mean, inter alia, that complex subsequent treatment of the resultant mouldings, in particular contact lenses, is unnecessary. The contact lenses obtainable by the crosslinking process are therefore distinguished, in an advantageous embodiment, by the fact that they are suitable for their intended use without extraction. The term 'intended use' in this connection is taken to mean, in particular, that the contact lenses can be employed in the human eye. The contact lenses obtainable by the crosslinking process are furthermore distinguished in an advantageous embodiment by the fact that they are suitable for their intended use without hydration.

The novel process therefore proves to be extremely suitable for the efficient production of a large number of mouldings, such as contact lenses, in a short time. The contact lenses obtainable by this process have, inter alia, the advantages over the contact lenses known from the prior art that they can be used as intended without subsequent treatment steps, such as extraction or hydration. The mouldings, in particular contact lenses, crosslinked in this way are three-dimensional polymeric networks, the crosslinking being possible through the formation of covalent and non-covalent (coordinative, ionic and in particular salt-like) bonds.

The examples below serve to further illustrate the invention. In the examples, unless expressly stated otherwise, amounts are by weight and temperatures are given in degrees celcius. Examples are not intended to represent any restriction of the invention, for example to the scope of the examples.

EXAMPLE 1

220 g (5.5 mol) of sodium hydroxide are dissolved in 300 g of water and 700 g of ice in a 3 liter reactor fitted with stirrer and cooling means. The sodium hydroxide solution is cooled to 10° C., and 526 g (5.0 mol) of aminoacetaldehyde dimethyl acetal and 50 mg of 4-hydroxy-2,2,6,6-tetramethylpiperidine 1-oxide (free-radical inhibitor) are added. 548.6 g (5.5 mol) of methacryloyl chloride are slowly added to this solution at 10° C. over the course of 3.5 hours. When the addition is complete, the pH slowly drops to 7.2, and amine is no longer detectable by GC. The reaction mixture is extracted with 500 ml of petroleum ether in order to remove impurities, and the water phase is saturated with sodium chloride and extracted three times with 500 ml of tert-butyl methyl ether. The organic phase is dried using magnesium sulfate, filtered and evaporated on a rotary evaporator. The 882.2 g of yellowish oil obtained are slowly stirred into 2000 ml of petroleum ether at −10° C. using an Ultraturax. The product crystallizes, and is filtered off and dried, giving 713.8 g of methacrylamidoacetaldehyde dimethyl acetal (86% of theory), melting point 30–32° C. The product is 99.7% pure according to GC.

EXAMPLE 2
N-[2,2-Dimethoxyethyl]Succinic Monoamide 50.04 g (0.5 mol) of freshly distilled succinic anhydride are dispersed in 100 ml of methylene chloride. 52.75 g (0.5 mol) of aminoacetaldehyde dimethyl acetal are added, and the mixture is boiled under reflux. After 30 minutes, the homogeneous solution is evaporated in vacuo and freed from solvent at 60° C. under a high vacuum, giving a viscous oil which, according to titration with sodium hydroxide solution, has a purity of 99.4%. NMR data: 2.63 ppm (m) 4 methylene protons of succinic acid, 3.42 ppm (s) 6 methoxy protons, 4.42 ppm (t) 1 acetal proton, 3.6 ppm (d) 2 methylene protons, 6.60 ppm (t) 1 amide proton, 9.79 ppm 1 acid proton

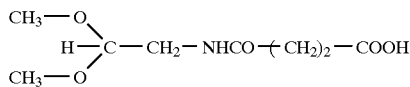

EXAMPLE 3
General Method for the Preparation of Low-acetate Products of the Reaction of PVA with Acetals or Aldehydes 300 g of a PVA (Mowiol 4–88, unless stated otherwise) are introduced into a 2 liter twin-jacket reactor fitted with stirrer and thermometer, 800 g of demineralized water are added, and the mixture is warmed to 95° C. with stirring. After one hour, all the reactants have dissolved to give a clear solution, which is cooled to 20° C. A crosslinkable acetal in the amount given in the examples, if desired together with one or more acetal(s), 440 g of acetic acid, 100 g of conc. hydrochloric acid (37%) and sufficient demineralized water to give a total of 2000 g of reaction solution are added. The mixture is stirred at 20° C. for 20 hours. After 20 hours, a sample of the reaction solution is titrated with NaOH, and the degree of hydrolysis of the PVA determined: HCl=1.034 meq/g, acetic acid=0.265 meq/g, corresponding to a residual acetate content of 3.5 mol%. The reaction mixture is stirred at 25° C. for a further two hours and re-titrated: HCl=1.034 meq/g, acetic acid=0.277 meq/g, corresponding to a residual acetate content of 2.93 mol%.

The isolation can also be carried out by ultrafiltration: the reaction mixture is cooled to 15° C. and adjusted to pH 7 using aqueous NaOH (5%). The polymer solution is filtered through a 0.45 μm filter and purified by ultrafiltration. The ultrafiltration is carried out by means of a 1 KD Omega membrane from Filtron. The ultrafiltration is continued to a residual sodium chloride content of 0.002%. 1800 g of a 14.02% polymer solution (86% of theory) are obtained; N content (Kjendahl determination)=0.741%, acetate content (according to titration)=0.605 meq/g, corresponding to 2.91 mol%, intrinsic viscosity=0.327, 0.61 meq/g of double bonds (determined by microhydrogenation), 18.13 meq/g of free hydroxyl groups (determined by re-acetylation), GPC analysis (in water): $M_w$=22,007, $M_n$=9743, $M_w/M_n$=2.26.

The isolation can also be carried out by precipitation: the reaction mixture is adjusted to pH 3.6 using triethylamine and precipitated in acetone in a ratio of 1:10. The precipitate is separated off, dispersed twice in ethanol and once in acetone and dried. The resultant product is comparable to that obtained above by ultrafiltration.

EXAMPLE 4
General Method for the Preparation of High-acetate Products of the Reaction of PVA with Acetals or Aldehydes 300 g of a PVA (Mowiol 4-88, unless stated otherwise) are introduced into a 2 liter twin-jacket reactor fitted with stirrer and thermometer, 800 g of demineralized water are added, and the mixture is warmed to 95° C. with stirring. After one hour, all the reactants have dissolved to give a clear solution, which is cooled to 20° C. A crosslinkable acetal in the amount given in the examples, if desired together with one or more acetal(s), 440 g of acetic acid, 100 g of conc. hydrochloric acid (37%) and sufficient demineralized water to give a total of 200 g of reaction solution are added. The mixture is stirred at 20° C. for 20 hours. The change in the acetal content can be determined by titration with acetic acid.

Isolation can be carried out by ultrafiltration: the reaction mixture is cooled to 15° C. and the pH is adjusted to 3.6 by means of aqueous NaOH (5%). The polymer solution is filtered through a 0.45 μm filter and purified by ultrafiltration. The ultrafiltration is carried out using a 1 KD Omega membrane from Filtron. The ultrafiltration is continued to a residual sodium chloride content of 0.004%. Before the purification is completed, the solution is adjusted to pH=7 using 0.1 N sodium hydroxide solution. Concentration gives 1995 g of a 14.54% polymer solution (92% of theory); N content (Kjendahl determination)=0.683%, acetate content (determined by hydrolysis)=2.34 meq/g, intrinsic viscosity= 0.310 dl/g, 0.5 meq/g of double bonds (determined by microhydrogenation), 15.3 meq/g of free hydroxyl groups (determined by re-acetylation), GPC analysis (in water): $M_w$=19,101, $M_n$=7522, $M_w/M_n$=2.54.

The isolation can also be carried out by precipitation: the reaction mixture is adjusted to pH 3.6 by means of triethylamine and precipitated in acetone in a ratio of 1:10. The precipitate is separated off, dispersed twice in ethanol and once in acetone and dried. The resultant product has the same properties as that obtained above by ultrafiltration.

EXAMPLES 5a) TO d)

Preparation Method as in Example 3, Products of the Reaction of PVA (Mowiol 4-88, Hoechst) with Acetal from Example 1 and the Acidic Modifier Acetal from Example 2, Reaction Time 12 Hours at 20° C., Isolation by Ultrafiltration (3KD Membrane)

5a): 56 g of acetal from Example 1 and 24 g of acidic modifier acetal from Example 2, preparation method of Example 3:

| | |
|---|---|
| Prepolymer data (sol): | N content: 1.66% |
| | Crosslinking agent content: 0.96 meq/g |
| | Total acetal content: 1.19 meq/g |
| | Acetate content: 7.2 mol% |
| Solids content: | 30% in the sol state result in 32.7% in the gel state. |

5b): 39 g of acetal from Example 1 and 25 g of acidic modifier acetal from Example 2, preparation method of Example 3:

| | |
|---|---|
| Prepolymer data (sol): | Intrinsic viscosity: 0.423 [dl/g] |
| | N content: 1.32% |
| | Crosslinking agent content: 0.62 meq/g |
| | Acid content: 0.32 meq/g |
| | Acetate content: 7.8 mol% |
| Solids content: | 30% in the sol state result in 32.6% in the gel state. |

5c): 30 g of acetal from Example 1 and 24 g of acidic modifier acetal from Example 2, preparation method of Example 4 using 500 g of acetic acid, reaction time 24 hours:

| | |
|---|---|
| Prepolymer data (sol): | Intrinsic viscosity: 0.331 [dl/g] |
| | N content: 1.18% |
| | Crosslinking agent content: 0.52 meq/g |
| | Acid content: 0.35 meq/g |
| | Acetate content: 10.3 mol % |
| Solids content: | 30% in the sol state result in 27.0% in the gel state. |

5d): 20 g of acetal from Example 1 and 24 g of acidic modifier acetal from Example 2, preparation method of Example 3, reaction time 9 hours:

| | |
|---|---|
| Prepolymer data (sol): | Intrisic viscosity: 0.390 [dl/g] |
| | N content: 0.994% |
| | Crosslinking agent content: 0.35 meq/g |
| | Acid content: 0.35 meq/g |
| | Acetate content: 8.0 mol % |

EXAMPLES 6a) AND b)

Products of the Reaction of PVA (Mowiol 4-88, Hoechst) with Acetal from Example 1 and ω-aminobutyraldehyde Diethyl Acetal, Preparation Method of Example 3, Isolation by Ultrafiltration 6a): 39 g of acetal from Example 1 and 20 g of ω-aminobutyraldehyde diethyl acetal, preparation method of Example 3, reaction time 9 hours:

| | |
|---|---|
| Prepolymer data (sol): | Intrinsic viscosity: 0.423 [dl/g] |
| | N content: 1.37% |
| | Crosslinking agent content: 0.64 meq/g |
| | Amine content: 0.35 meq/g |
| | Acetate content: 10.0 mol % |

6b): 30 g of acetal from Example 1 and 5.2 g of ω-aminobutyraldehyde diethyl acetal, preparation method of Example 4, 500 g of added acetic acid, reaction time 24 hours:

| | |
|---|---|
| Prepolymer data (sol): | Intrinsic viscosity: 0.339 dl/g |
| | N content: 0.89% |
| | Crosslinking agent content: 0.54 meq/g |
| | Amine content: 0.10 meq/g |
| | Acetate content: 12.0 mol % |
| Solids content: | 30% in the sol state result in 29.6% in the gel state. |

EXAMPLE 7
Production of Contact Lenses 200 g of a 16.35% aqueous acid-containing (0.32 meq/g of acid) polymer solution from Example 5b) are mixed with 180 g of a 16.53% aqueous base-containing (0.35 meq/g of base) polymer solution from Example 6a). The clear solution is subsequently desalinated via a 3 KD Filtron membrane and subsequently concentrated to a solids content of 30%.

| | |
|---|---|
| Prepolymer data (sol): | Intrinsic viscosity: 0.393 dl/g |
| | Crosslinking agent content: 0.62 meq/g |
| | Acetate content: 8.8 mol % |
| | GPC data: $M_w$ = 20,887, $M_n$ = 8799, $M_w/M_n$ = 2.37 |

This 30% polymer solution (mixture of crosslinkable acid-containing and base-containing polymer soluton) is mixed with 0.3% (based on the polymer content) of the photoinitiator Irgacure 2959. In a transparent contact-lens mould made from polypropylene, the solution is exposed for 6 seconds to a 200 W Oriel UV lamp (150 mW/cm$^2$). The lenses are removed from the mould. They are transparent and have the properties shown below.

| | |
|---|---|
| Solids content: | 30% in the sol state results in 33.7% in the gel state |

What is claimed is:

1. A process for the production of mouldings which comprises the following steps:
   a) preparing an aqueous solution of a photocrosslinkable polymer comprising units containing a carbon-carbon double bond crosslinkable group, units containing an acidic group and units containing a basic group, or an aqueous solution of a mixture of at least two different photocrosslinkable polymers, where at least one polymer comprises units containing a carbon-carbon double bond crosslinkable group and units containing an acidic group, and where at least one further polymer comprises units containing a carbon-carbon double bond crosslinkable group and units containing a basic group:
   b) introducing the resultant solution into a mould,
   c) photocrosslinking the solution in the mould, and
   d) opening of the mould so that the moulding can be removed.

2. A process according to claim 1, wherein the mouldings are contact lenses.

3. A process according to claim 1, wherein the essentially aqueous solution of the crosslinkable polymer comprising units containing a crosslinkable group, units containing an acidic group and units containing a basic group, or the essentially aqueous solution of a mixture of at least two different crosslinkable polymers, where at least one polymer comprises units containing a crosslinkable group and units containing an acidic group, and where at least one further polymer comprises units containing a crosslinkable group and units containing a basic group, is free or essentially free from undesired constituents, such as, in particular, from monomeric, oligomeric or polymeric starting compounds used for the preparation of the crosslinkable polymer, or from byproducts formed during the preparation of the crosslinkable polymer.

4. A process according to claim 1, wherein the essentially aqueous solution of the crosslinkable polymer is used without addition of a comonomer.

5. A process according to claim 1, wherein an initiator for the crosslinking is added to the solution of the crosslinkable polymer.

6. A process according to claim 1, wherein the crosslinking is not followed by extraction in order to remove undesired constituents.

7. A process according to claim 1, which comprises the following steps:
   a) preparation of an essentially aqueous solution of a crosslinkable polymer comprising units containing a crosslinkable group, units containing an acidic group and units containing a basic group, or an essentially aqueous solution of a mixture of at least two different crosslinkable polymers, where at least one polymer comprises units containing a crosslinkable group and units containing an acidic group, and where at least one further polymer comprises units containing a crosslinkable group and units containing a basic group, which is free or essentially free from undesired constituents, such as, in particular, from monomeric, oligomeric or polymeric starting compounds used for the preparation of the crosslinkable polymer, or from byproducts formed during the preparation of the crosslinkable polymer, and the aqueous solution is used without addition of a comonomer,
   b) introduction of the resultant solution into a mould,
   c) initiation of the crosslinking, and
   d) opening of the mould so that the moulding can be removed.

8. A process according to claim 7, wherein the moulding is a contact lens.

9. A process for the production of a contact lens according to claim 8, wherein the essentially aqueous solution is a purely aqueous solution or a solution in an artificial tear fluid.

10. A process for the production of a contact lens according to claim 8, wherein a crosslinking initiator is added to the solution.

11. A process for producing a contact lens, which comprises the following steps:
   a) preparing an aqueous solution of a photocrosslinkable polymer comprising units containing an olefinically unsaturated crosslinkable group, units containing an acidic group and units containing a basic group, or an aqueous solution of a mixture of at least two different photocrosslinkable polymers, wherein one polymer comprises units containing an olefinically unsaturated crosslinkable group and units containing an acidic group, and one further polymer comprises units containing an olefinically unsaturated crosslinkable group and units containing a basic group,
   b) introducing the resultant solution into a mould, and
   c) photocrosslinking the solution in the mould to form the contact lens, wherein the contact lens is suitable for use without extraction.

* * * * *